(12) United States Patent
Niwa

(10) Patent No.: US 6,882,174 B2
(45) Date of Patent: Apr. 19, 2005

(54) TERMINATION CONTROL DEVICE, AND UNIVERSAL SERIAL BUS SYSTEM

(75) Inventor: Takahiro Niwa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 10/692,719

(22) Filed: Oct. 27, 2003

(65) Prior Publication Data

US 2004/0113651 A1 Jun. 17, 2004

(30) Foreign Application Priority Data

Oct. 28, 2002 (JP) .................................. 2002-312671

(51) Int. Cl.$^7$ .......................................... H03K 19/003
(52) U.S. Cl. .......................................... 326/30; 326/27
(58) Field of Search ................................ 326/30, 26–27, 326/31, 34

(56) References Cited

U.S. PATENT DOCUMENTS 6,166,563 A * 12/2000 Volk et al. .................. 326/87
6,762,620 B1 * 7/2004 Jang et al. ................... 326/30

OTHER PUBLICATIONS

Universal Serial Bus Specification, Revision 2.0, Apr. 27, 2000 (Compaq, Hewlett–Packard, Intel, Lucent, Microsoft, NEC, Philips), pp. viii and 144–155.

* cited by examiner

Primary Examiner—James H. Cho
(74) Attorney, Agent, or Firm—Staas & Halsey LLP

(57) ABSTRACT

It is intended to provide a terminal control device and a universal serial bus system capable of achieving stable system operation wherein the termination control device controls termination considering propagation delay time required for bus voltage level to shift to termination voltage when a universal serial bus system is terminated and an erroneous detection due to propagation delay time of voltage level shifting is avoided, accordingly. A pull-up start signal PU is inputted to a mask counter 11, timing operation is conducted in a manner of count operation. As a result of count operation, mask count signals MC are outputted to a comparator 13. Masking-time setting signals SC are inputted to the comparator 13. The mask count signals MC and the masking-time setting signals SC are compared to calculate a predetermined length of masking time that begins with start of pull-up. During this masking time, detection of SE0 state or bus-reset state is masked. Thereby, there can be avoided erroneous detection of an SE0 during transition period after start-up of the system, and termination control can surely be conducted.

16 Claims, 5 Drawing Sheets

CIRCUIT BLOCK DIAGRAM OF FIRST EMBODIMENT

CIRCUIT BLOCK DIAGRAM OF FIRST EMBODIMENT

CIRCUIT BLOCK DIAGRAM OF SECOND EMBODIMENT

TERMINATION CIRCUIT OF UNIVERSAL SERIAL BUS

TERMINATION CONTROL DEVICE, AND UNIVERSAL SERIAL BUS SYSTEM

CROSS-REFERENCE TO RELATED APPLICATIONS

This application is based upon and claims the benefit of priority from each of the prior Japanese Patent Application No. 2002-312671 filed on Oct. 28, 2002, the entire contents of which are incorporated herein by reference.

BACKGROUND OF THE INVENTION

1. Field of the Invention

The present invention relates to universal serial bus system and more particularly relates to termination function of bus for peripheral equipment connected to universal serial bus system.

2. Description of Related Art

"Universal Serial Bus Specification", a non-patent publication, discloses specifications of universal serial bus, abbreviated as USB hereinafter. The specification describes that in case peripheral equipment is connected to a bus and in case a high-speed mode in which a termination circuit is not connected to a bus shifts to a suspend state, termination operation of a bus is started by a pull-up circuit such as a pull-up resistor or the like as a termination circuit.

When a termination operation starts, a signal line D+ or D− is pulled up and the following matters are verified: (1) whether or not peripheral equipment is connected to a host or a hub; and (2) whether or not a high-speed mode is suspended and operation speed shifts to a full-speed mode.

FIG. 5 shows a termination operation of a USB. A USB 100 is connected between a host or a hub and peripheral equipment. Depending on its wiring length, a parasitic resistor RL and a parasitic capacity CL are provided as wiring load. One of terminals of the USB 100 is connected to a pull-up circuit provided in peripheral equipment (not shown). The pull-up circuit PU1 includes a switch circuit SW1 that connects between pull-up voltage VH and USB 100 via a termination resistor R1. When the switch circuit SW1 is closed, the USB 100 is charged with pull-up voltage VH. Voltage level does not rise suddenly due to a response time of the switch circuit SW1, pull-up drivability of the termination circuit PU1, wiring load on the USB 100, and the like, but reaches its predetermined voltage through predetermined propagation delay. Accordingly, predetermined time is required for a host or a hub to detect a termination operation by peripheral equipment.

When the host or the hub verifies a termination operation by peripheral equipment, the operation is set to SE0 (Signal Ended 0) state to set signal lines D+ and D− in negate state. When SE0 state lasts for 2.5 μsec or longer, bus reset state is transmitted and peripheral equipment is initialized. In addition to it, data-transfer speed is determined. Thereby, data transfer between the host or the hub and peripheral equipment becomes possible.

However, the signal lines D+ and D− are in negate state until the termination circuit PU1 starts operation from a termination start instructed by peripheral equipment and either the signal line D+ or the signal line D− is charged up to predetermined voltage level. Accordingly, there is a fear that the peripheral equipment erroneously detects the above period as SE0 state. In case this erroneous detection period lasts for 2.5 μsec or longer due to a response time of the switch circuit SW1, pull-up drivability of the pull-up circuit PU1 or wiring load on the USB 100 and the like, there arises a fear that the peripheral equipment erroneously detects a bus reset state, which is problematic.

That is, between the peripheral equipment that has erroneously detected a bus reset state and the host or hub that has not yet detected the signal line D+ or D− being pulled up, the USB 100 has inconsistent recognition state at its interface. Such inconsistent recognition state can possibly cause operation trouble afterwards, which is problematic.

For example, in case erroneous detection of SE0 state lasts for 2.5 μsec or longer, peripheral equipment erroneously can detect a bus reset state erroneously to solely initiate bus reset sequence irrespective of an instruction from a host or the like. An aspect that a signal line D+ is pulled up as termination operation is taken into consideration, a signal line D− is asserted based on specified sequence in case peripheral equipment shifts to chirp processing when the signal line D+ reaches a predetermined voltage level. However, due to the above operation, a host or the like detects both the signal line D+ and the signal line D− as being asserted. Thereby, the host or the like detects disorder of connected peripheral equipment or a bus and connection to the bus is shut down. Shut-down of connection to a bus hinders normal operation of system, which is problematic.

SUMMARY OF THE INVENTION

The present invention has-been made to resolve at least one of the above problems. Accordingly, it is an object of the present invention to provide a terminal control device and a universal serial bus system capable of achieving stable system operation wherein the termination control device controls termination considering propagation delay time required for bus voltage level to shift to termination voltage when a universal serial bus system is terminated and an erroneous detection due to propagation delay time of voltage level shifting is avoided, accordingly.

To achieve the object, according to one aspect of the present invention, there is provided a termination control device capable of switching presence/absence of termination for predetermined signal line(s) for a universal serial bus, the termination control device comprising: a permission timing setting section for outputting a permission signal by timing predetermined length of time from a termination start signal; and a state detecting section for detecting a state of the predetermined signal line(s), the state detecting section being activated based on the permission signal.

Furthermore, according to the first aspect of the present invention, there is also provided universal serial bus system capable of switching presence/absence of termination for predetermined signal line(s), the universal serial bus system comprising: a permission timing setting section for outputting a permission signal by timing predetermined length of time from a termination start signal; and a state detecting section for detecting a state of the predetermined signal line(s), the state detecting section being activated based on the permission signal.

In the termination control device or the universal serial bus system both directed to the fist aspect of the present invention, the permission timing setting section outputs a permission signal after a predetermined length of time passes from start of termination at the predetermined signal line(s). This permission signal activates the state detecting section, whereby the state detecting section can detect a state of the predetermined signal line(s).

A predetermined length of time is secured so that the predetermined signal line(s) shift to termination state from termination start state triggered by a termination start signal. After a predetermined length of time is secured, a permission signal is outputted and the state detecting section can start detecting. There is never erroneously detected a state of the predetermined signal line(s) in transition period where the predetermined signal line(s) shift to its termination state. Thereby, there can be avoided situation such that state of the predetermined signal line(s) in transition period is erroneously detected. Furthermore, termination control can surely be conducted.

It should be noted that termination corresponds to pulling up of voltage level and signal lines D+ and D− are included as a predetermined signal lines. As a predetermined length of time, there is secured time that termination starts and the signal line D+ or D− is pulled up to be in an assert state. After the predetermined length of time is secured, the permission timing setting section outputs a permission signal. It is preferable that the state detecting section is activated based on the permission signal and becomes able to detect an SE0 state at a predetermined signal line(s) or otherwise, able to detect a bus reset state propagated through a predetermined signal line(s) due to continuance of an SE0 state. That is, after the signal lines D+ and D− as predetermined signal line(s) are surely terminated, an SE0 state at the predetermined signal line(s) or a bus reset state as a result of continuance of an SE0 state becomes detectible. Thereby, there can be avoided an erroneous detection of an SE0 state or a bus reset state during a transition period that is from start of termination till reach of an assert state.

According to Universal Serial Bus Specification, an SE0 state indicates a case that voltage level of a signal line D+ and that of a signal line D− in a universal serial bus are in a negate state. Furthermore, a bus reset state indicates a state that an SE0 state lasting for predetermined length of time is alarmed.

Furthermore, pulling up at termination operation includes operation to charge at least one of the signal lines D+ and D− up to voltage level of an assert state. In the termination control device, after state of the signal lines are made to change into state other than an SE0 state by termination operation, verification of a bus reset state is made by detecting transition to an SE0 state and operation setting for the system constituted by the universal serial bus is conducted.

According to a second aspect of the present invention, there is provided a termination control device capable of switching presence/absence of termination for predetermined signal line(s) for a universal serial bus, the termination control device comprising: a voltage detecting section for detecting voltage level of the predetermined signal lines; and a state detecting section for detecting a state of the predetermined signal line(s), the state detecting section being activated based on an alarm signal outputted from the voltage detecting section when voltage level at the predetermined signal line(s) reaches termination voltage level.

Furthermore, according to the second aspect of the present invention, there is also provided universal serial bus system capable of switching presence/absence of termination for predetermined signal line(s), the universal serial bus system comprising: a voltage detecting section for detecting voltage level of the predetermined signal line(s); and a state detecting section for detecting state of the predetermined signal line(s), the state detecting section being activated based on an alarm signal outputted from the voltage detecting section when voltage level at the predetermined signal line(s) reaches termination voltage level.

In the termination control device or the universal serial bus system both directed to the second aspect of the present invention, when the voltage detecting section detects that voltage level of the predetermined signal line(s) reaches termination voltage level, the voltage detecting section outputs an alarm signal. This alarm signal activates the state detecting section and the state detecting section can detect state of the predetermined signal line(s).

With operation such as above, the voltage detecting section detects voltage level of the predetermined signal line(s) in which termination are started by a termination start signal. After the voltage detecting section detects termination voltage level, the state detecting section can start detecting. Therefore, there is never erroneously detected state of the predetermined signal line(s) in transition period where the predetermined signal line(s) shifts to its termination state. Thereby, there can be avoided situation such that state of the predetermined signal line(s) in transition period is erroneously detected, and termination control can surely be conducted.

It should be noted that termination corresponds to pulling up of voltage level and signal lines D+ and D− are included as predetermined signal lines. When it is detected that the signal line D+ or D− is pulled up to be in an assert state by start of termination, an alarm signal is outputted. It is preferable that the state detecting section is activated by the alarm signal and becomes able to detect an SE0 state at a predetermined signal line(s) or otherwise, able to detect a bus reset state propagated through predetermined signal line(s) due to continuance of an SE0 state. Thereby, a bus reset state as a result of continuance of an SE0 state becomes detectible on condition that voltage level at the signal lines D+ and D− as predetermined signal lines is detected and termination timing is grasped. Thereby, there can be avoided an erroneous detection of an SE0 state or a bus reset state during a transition period that is from start of termination till reach of an assert state.

According to a third aspect of the present invention, there is provided a termination control device capable of switching presence/absence of termination for predetermined signal line(s) for a universal serial bus, the termination control device comprising: a permission timing setting section for outputting a permission signal by timing predetermined length of time from a termination start signal; a voltage detecting section for detecting voltage level of the predetermined signal line(s); and a state detecting section for detecting a state of the predetermined signal line(s) upon activation based on mechanism that the permission signal and an alarm signal outputted from the voltage detecting section when voltage level of the predetermined signal line(s) reaches termination voltage level are inputted and activated.

Furthermore, according to the third aspect of the present invention, there is also provided universal serial bus system capable of switching presence/absence of termination for predetermined signal line(s), the universal serial bus system comprising: a permission timing setting section for outputting a permission signal by timing predetermined length of time from a termination start signal; a voltage detecting section for detecting voltage level of the predetermined signal line(s); and a state detecting section for detecting a state of the predetermined signal line(s), the state detecting section being activated based on mechanism that the permission signal and an alarm signal outputted from the voltage detecting section when voltage level of the predetermined signal line(s) reaches termination voltage level are inputted and activated.

In the termination control device or the universal serial bus system both directed to the third aspect of the present invention, after a predetermined length of time passes from start of termination, the permission timing setting section outputs a permission signal. Furthermore, the voltage detecting section outputs an alarm signal when voltage level of predetermined signal line(s) reach its terminal voltage level. The state detecting section is activated on condition that both a permission signal and an alarm signal are activated, whereby the state detecting section can detect state of the predetermined signal lines.

Thereby, as a predetermined length of time, there is secured time required for predetermined signal line(s) to start termination based on a termination start signal and shift to a termination state. In addition to it, after the voltage detecting section detects termination voltage level of the predetermined signal line(s), the state detecting section can start detecting. Therefore, there is never erroneously detected state of the predetermined signal line(s) in transition period where the predetermined signal line(s) shift to its termination state. Thereby, there can be avoided situation such that state of the predetermined signal line(s) in transition period is erroneously detected, and termination control can surely be conducted.

It should be noted that termination corresponds to pulling up of voltage level and signal lines D+ and D− are included as predetermined signal lines. As a predetermined length of time, there is secured time that termination starts and the signal line D+ or D− is pulled up to be in an assert state. After the predetermined length of time is secured, the permission timing setting section outputs a permission signal. It is preferable that when both the permission signal and the alarm signal are activated, the state detecting section is activated and becomes able to detect an SE0 state at a predetermined signal line(s) or otherwise, able to detect a bus reset state propagated through a predetermined signal line(s) due to continuance of an SE0 state. That is, after the signal line D+, D− as predetermined signal line(s) are surely terminated, an SE0 state at the predetermined signal line(s) or a bus reset stated as a result of continuance of an SE0 state becomes detectible. Thereby, there can be avoided an erroneous detection of an SE0 state or a bus reset state during a transition period that is from start of termination till reach of an assert state.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the inventive termination control device and universal serial bus system will be described in detail below by referring to FIG. 1 through FIG. 4.

Figure 1:
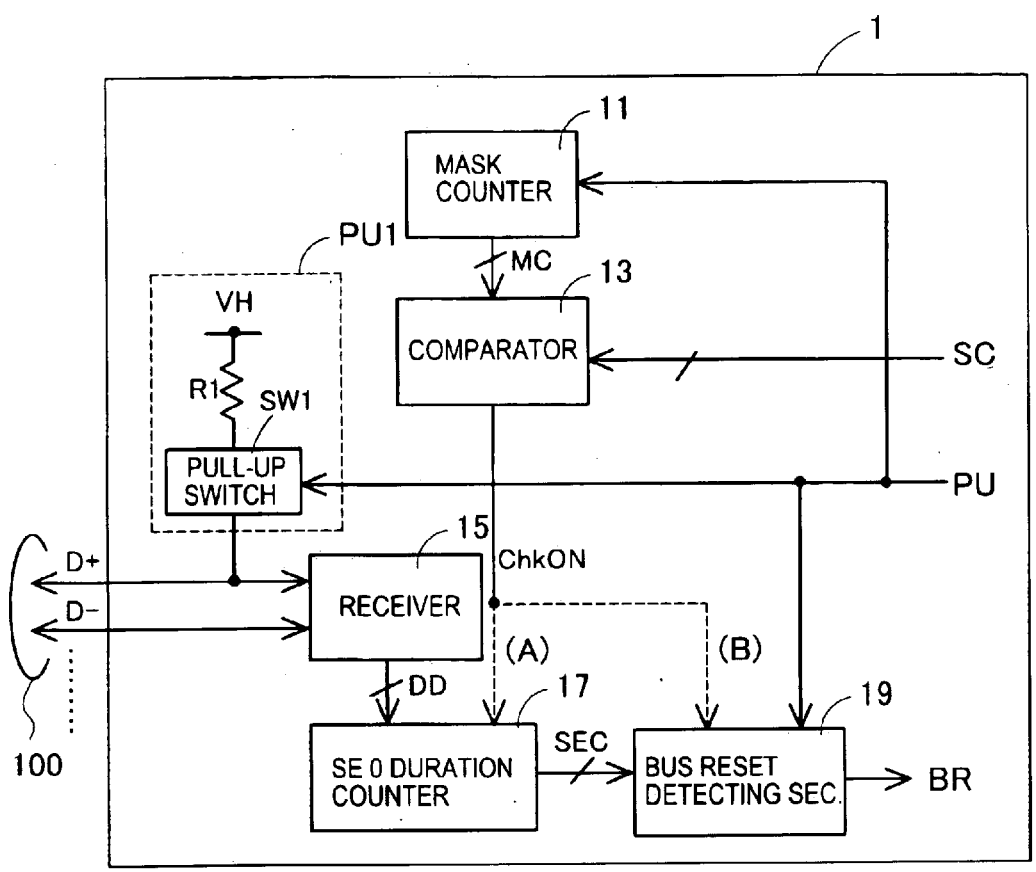
FIG. 1 is a circuit block diagram of a first embodiment.

FIG. 1 shows a circuit block diagram of a first embodiment. The circuit block diagram shows a termination control device 1 to be connected to a universal serial bus (abbreviated as USB hereinafter) 100 wherein conditions of signal lines D+ and D− can be detected after predetermined length of time for the signal line D+ to shift from beginning of termination to terminated state is secured. The termination control device 1 is arranged inside peripheral equipment (not shown) to be connected to the USB 100 or at the vicinity of the peripheral equipment. The peripheral equipment is to exchange signals with a host or hub via the USB 100.

As representatives of the USB 100, the signal lines D+ and D− will be described. The signal lines D+ and D− are connected to the termination control device 1. The signal lines D+ and D− are further connected to a receiver 15 inside the termination control device 1 and the signal line D+ is also connected to a pull-up circuit PU1. The pull-up circuit PU1 is connected to the signal line D+ by way of from pull-up voltage VH through a pull-up resistance R1 and a pull-up switch SW1. A pull-up start signal PU is inputted to the pull-up switch SW1, whereby open/close switching is controlled.

The receiver 15 converts voltage levels propagating in the signal lines D+ and D− as analog voltage values into binarized digital values and outputs state signals DD. The state signals DD are inputted to an SE0-duration counter 17. A permission signal ChkON (described later) is inputted to the SE0-duration counter (in case of (A)). After a permission signal ChkON is activated, both the signal line D+ and the signal line D− are negated and duration of SE0 state is timed wherein counting operation is conducted along with input of state signals DD that indicate SE0 state. Count signals SEC outputted as time result are inputted to a bus reset detecting section 19. In case voltage level is in an assert state with respect to at least one of the signal lines D+ and D−, counter values stored in the SE0-duration counter 17 can be reset. Before shifting to SE0 state, counter values have been reset.

A permission signal ChkON (described later) as well as a pull-up start signal PU are inputted to the bus reset detecting section 19 (in case of (B)). When both of the signals are activated, count signals SEC are detected. As a result, there is outputted a bus reset signal BR that indicates completion of bus reset.

The termination control device 1 further includes a mask counter 11 and a comparator 13. The mask counter 11 times duration of masking PU by counting up from input of the pull-up start signal PU. The mask counter 11 outputs mask count signals MC, as a count result, to the comparator 13. As a comparison subject for mask count signals MC, masking-time setting signals SC are inputted to the comparator 13. Bit structure of masking-time setting signals SC in this case is same as that of a mask count signals MC. Therefore, predetermined masking time that begins with pull-up start is timed by comparing a bit value of mask count signals MC and that of masking-time setting signals SC. During this masking time, detection operation of SE0 state or detection operation of bus reset state is masked. The comparator 13 outputs a permission signal ChkON along with masking time timed at the mask counter 11.

A permission signal ChkON outputted from the comparator 13 is inputted to at least one of either the SE0 duration counter 17 (in case of (A)) or the bus reset detecting section 19 (in case of (B)). In case of (A), the SE0 duration counter 17 is activated upon activation of a permission signal ChkON. In case an SE0 state lasts at the signal lines D+, D−, the SE0 duration counter is set to be able to detect duration of SE0 state. In case of (B), the bus reset detecting section 19 is activated upon activation of a permission signal ChkON. Thereby, the bus reset detecting section 19 is set to be able to detect bus reset state depending on duration of SE0 state detected by the SE0 duration counter 17.

It should be noted that a bus reset signal BR or a pull-up start signal PU and a masking-time setting signal SC is/are signal(s) to be inputted/outputted to a control section such as CPU (not shown) in the termination control device.

Figure 2:
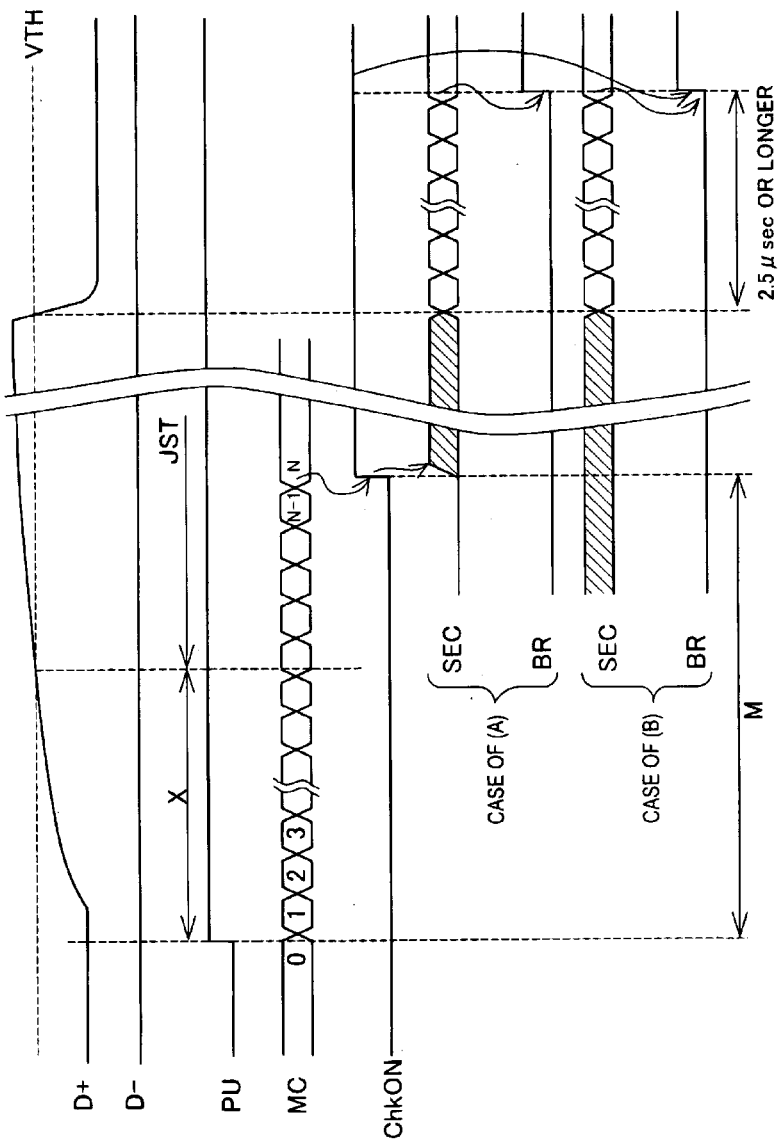
FIG. 2 is an operational waveform of the first embodiment.

Operation of the circuit block directed to the first embodiment will be described by referring to an operational waveform of FIG. 2. At stage of the very initial start-up of the system, initial setting and the like for peripheral equipment (not shown) or a host or the like (not shown) is conducted. Therefore, a pull-up start signal PU is in a negate state and a pull-up start instruction is not given by a controller (not shown) of the termination control device 1. At this stage, the signal line D+ is separated from the termination circuit PU1. Therefore, even though a physical cable, namely, the USB 100, connects the peripheral equipment and the host or the like, the host cannot recognize the peripheral equipment.

When initial setting for peripheral equipment completes and the peripheral equipment gets into logically connectible to transmit signals and the like through the USB 100, a pull-up signal PU is asserted by the controller and the signal line D+ is connected to the pull-up circuit PU1. Thereby, pull-up of the signal line D+ is started. At the same time, counting operation is started by the mask counter 11 and a count value of mask count signals MC is incremented in order. It should be noted that the operational waveform in FIG. 2 shows existence of time delay between assertion of a pull-up start signal PU and start of pull-up of the signal line D+ and this time delay is caused by circuitry propagation delay in the termination control device 1.

Figure 5:
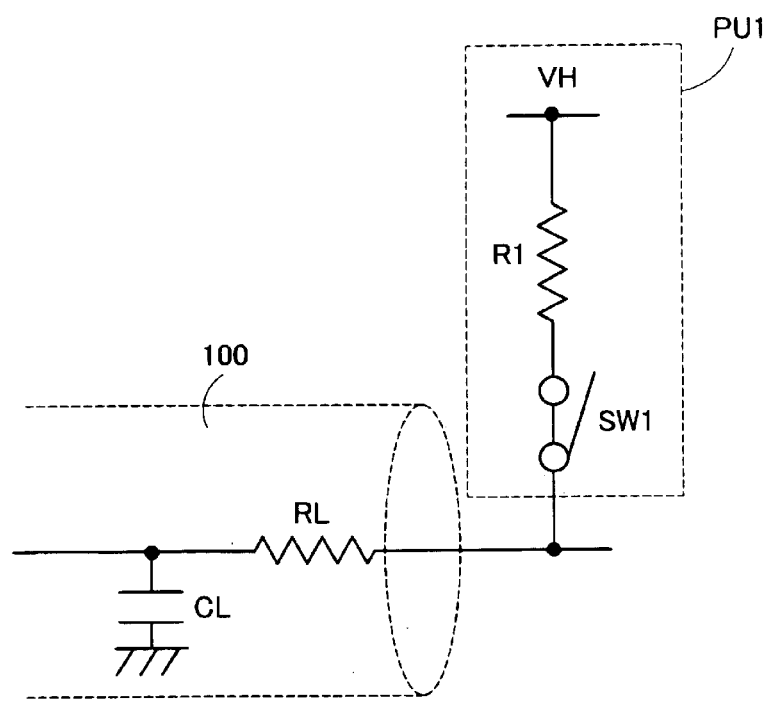
FIG. 5 is a circuit diagram showing a termination circuit of a universal serial bus.

The signal line D+ has wiring loads (RL, CL) as shown in FIG. 5. Being connected to pull-up voltage VH via a pull-up resistance R1, the signal line D+ has a predetermined time constant. Therefore, pull-up of voltage level rises gradually. Furthermore, rising speed of voltage level at the signal line D+ is limited depending on pull-up drivability of the pull-up circuit PU1.

Voltage level of the signal line D+ rises gradually and in the receiver 15, voltage level of the signal line D+ (as well as the signal line D−) is converted into a digital-valued state signals DD on condition that voltage VTH is regarded as threshold voltage. When the signal line D+ exceeds threshold voltage level VTH, it shifts to so-called a J-state JST wherein the signal line D+ becomes in an assert state while the signal line D− is kept in negate state. Shift to J-state JST makes the host or the like to recognize that a bus is connected to the peripheral equipment. A bus reset sequence is executed with timing taken after a shift to J-state JST. A bus reset sequence is executed along with a predetermined time SE0 generated by the host and the like.

During a transition period X taken until a shift to J-state JST, the signal lines D+ and D− are in negate state. Primarily, SE0 state shall be set on condition that the signal lines D+ and D− become in negate state after a shift to J-state JST, however, voltage level state equivalent to SE0 state actually exists during a transition period X. This voltage level is equivalent to SE0 state in terms of voltage level of SE0 state, however, it is far from actual SE0 state. That is, erroneous detection of an SE0 state during a transition period X must be avoided.

It is a permission signal ChkON that is a signal for preventing erroneous detection of an SE0 state during a transition period X. Masking-time setting signals SC are set to N count so as to set a period where the mask counter 11 asserts a pull-up start signal PU and starts N count as a masking period M. Since a count value of mask count signals MC and that of masking-time setting signals SC do not coincide at the comparator 13, a pull-up permission signal ChkON is kept in a negate state. When mask count signals MC count N count and the N count coincides with masking-time setting signals SC set to N count, a pull-up permission signal ChkON is inverted to assert state and this assert is kept.

Suppose that a masking period M (in case of a count value N) set by masking-time setting signals SC last for 2.5 µsec or longer, which is duration of SE0 state long enough to detect bus reset state, and for 3 msec or shorter, which is duration of J-state JST short enough to shift suspend state. Generally, it is preferable that a masking period M be set longer than a transition period X. However, even if a masking period M is shorter than a transition period X, normal operation is possible under the following condition: transition period X coming after the masking period M is shorter than 2.5 µsec. Under such condition, SE0 state can possibly be detected erroneously while bus reset state is never detected erroneously, whereby normal operation is possible. For example, it is conceivable to set a masking period M to 100 µsec.

A pull-up permission signal Chkon inverted to assert state activates the SE0 duration counter 17 (in case of (A)) or the bus reset detecting section 19 (in case of (B)). After timing of the above activation, voltage level of the signal lines D+ and D− which have shifted to J-state JST is monitored so as to detect SE0 state driven by the host or the like or bus reset state as a duration result of SE0 state.

In case of (A), when the SE0 duration counter 17 is activated, the activated SE0 duration counter 17 conducts count operation while state signals DD from the receiver 15 indicates SE0 state. Outputted count signals SEC are transmitted to the bus reset detecting section 19. The bus reset detecting section 19 activated by a pull-up start signal PU in assert state detects whether count signals SEC have a predetermined value or not. The predetermined value herein is a count value that indicates SE0 state lasts for 2.5 µsec or longer. Thereby, it is detected that SE0 state lasts for 2.5 µsec or longer and along with that, the bus reset detecting section 19 detects that the signal lines D+ and D− are in bus reset state and outputs a bus reset signal BR. In case of (A), the SE0 duration counter 17 is activated after a lapse of a masking period M. At the very initial of system's starting up, the SE0 duration counter 17 is kept in non-active state. That is, this state prevents the SE0 duration counter 17 from counting unnecessary SE0 duration at the very initial starting-up, whereby consumption of current can be lowered.

In case of (B), while the SE0 duration counter 17 is being activated, the bus reset detecting section 19 is newly activated and detects whether count signals SEC have a predetermined value or not. The predetermined value herein is a count value that indicates SE0 state lasts for 2.5 µsec or longer. Thereby, it is detected that SE0 state lasts for 2.5 µsec or longer and along with that, the bus reset detecting section 19 detects that the signal lines D+ and D− are in bus reset state and outputs a bus reset signal BR. In case of (B), the SE0 duration counter 17 is kept in an active state even while in a J-state JST. Therefore, The system can promptly respond to start of SE0 state.

As described, in the termination control device 1 and the universal serial bus system directed to the first embodiment, a permission signal ChkON is outputted after masking-time setting signals SC has functioned to secure a predetermined time required for the signal line D+ as a predetermined signal line to shift to termination state from start of termination triggered by a pull-up start signal PU as a termination start signal. After predetermined time is secured, a permission signal ChkON is outputted and SE0 state and bus reset state as an SE0 duration result become detectable.

During a masking period M set by masking-time setting signals SC, SE0 state and bus reset state as an SE0 duration result are masked to be undetectable. Therefore, it never occurs that the termination control device 1 erroneously detects an SE0 state or a bus reset state as an SE0 duration result during a transition period at initial of start-up operation. In case it is after a bus state has shifted to a J-state JST or in case a transition period X lasts shorter than duration of an SE0 state for detecting a bus reset state, a masking period M ends up. Therefore, in a subsequent J-state JST, an SE0 state along with bus reset sequence command from the host or the like or a bus reset state can be detected. That is, a normal SE0 state or a bus reset state as an SE0 duration result can surely be detected while erroneous detection at the initial of starting-up is avoided, whereby termination control can surely be executed.

It is convenient to be structured such that a masking period M can be set outside by masking-time setting signals SC. Appropriate duration of masking periods M can be set constantly regardless of difference of wiring load in the USB 100 and the pull-up resistance R1 in the pull-up circuit PU1 and variation of transition periods X due to difference of response time of various circuits that constitute the termination control device 1.

Figure 3:
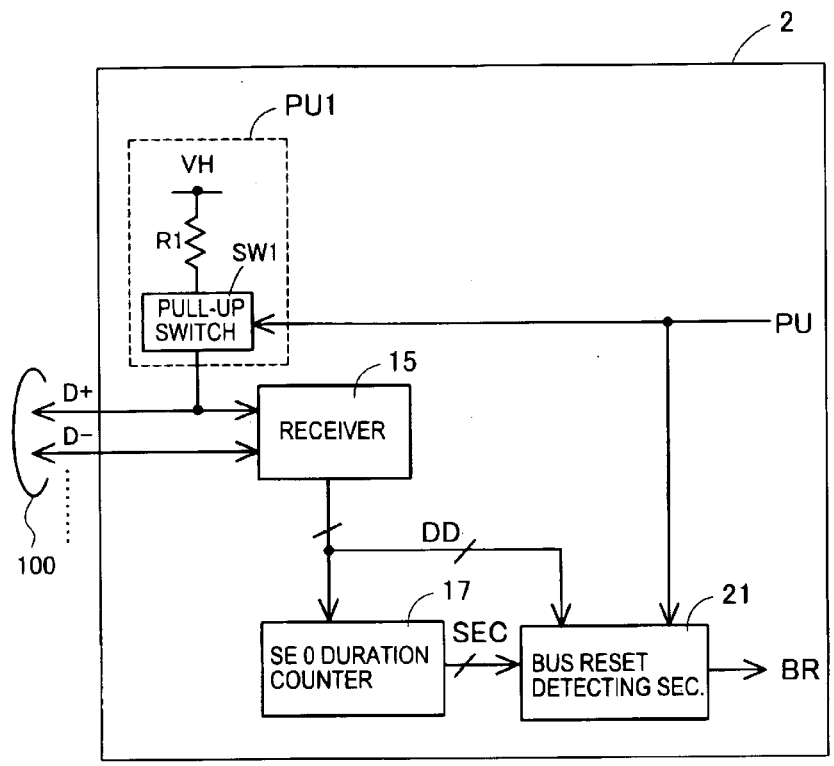
FIG. 3 is a circuit block diagram of a second embodiment.

FIG. 3 shows a circuit block diagram directed to a second embodiment. The circuit block diagram shows a termination control device 2 to be connected a USB 100 wherein voltage-level transition of signal lines D+ and D− can be detected after completion of termination is verified by detecting voltage-level transition of the signal line D+. The termination control device 2 is arranged inside peripheral equipment (not shown) to be connected to the USB 100 or at the vicinity of the peripheral equipment. The equipment is to exchange signals with a host or a hub via the USB 100.

Structure of the termination control device 2 is equivalent to that of the termination control device 1 from which the mask counter 11 and the comparator 13 are excluded. In the termination control device 2, state signals DD, output signals from a receiver 15, are inputted to an SE0 duration counter 17 as well as to a bus reset detecting section 21.

When state signals DD to be inputted commands a J-state. JST, the SE0 duration counter 17 is activated and count operation for an SE0 state of after the activation is conducted, whereby duration of SE0 state is timed. It should be noted that an input of count signals SEC to the bus reset detecting section 21, reset condition of a counter value in the SE0 duration counter 17 and the like are same as the case of the termination control device 1.

When state signals DD to be inputted commands J-state JST, the bus reset detecting section 21 is activated and count signals SEC outputted from the SE0 duration counter 17 in response to the SE0 state after the activation is detected. As a result, a bus reset signal BR that indicates completion of bus reset is outputted.

State signals DD at the termination control device 2 works equivalently as a permission signal ChkON at the termination control device 1. That is, in case state signals DD are inputted to the SE duration counter 17, state signals DD of indicating J-state JST activate the SE0 duration counter 17 and in case SE0 state is maintained at the signal lines D+ and D−, the SE0 duration counter 17 is set to be able to detect duration. In case state signals DD are inputted to the bus reset detecting section 21, state signals DD of indicating J-state JST activate the bus reset detecting section 21, the bus reset detecting section 21 is set to be able to detect bus reset state depending on a SE0 duration detection result obtained by the SE0 duration counter 17.

Figure 4:
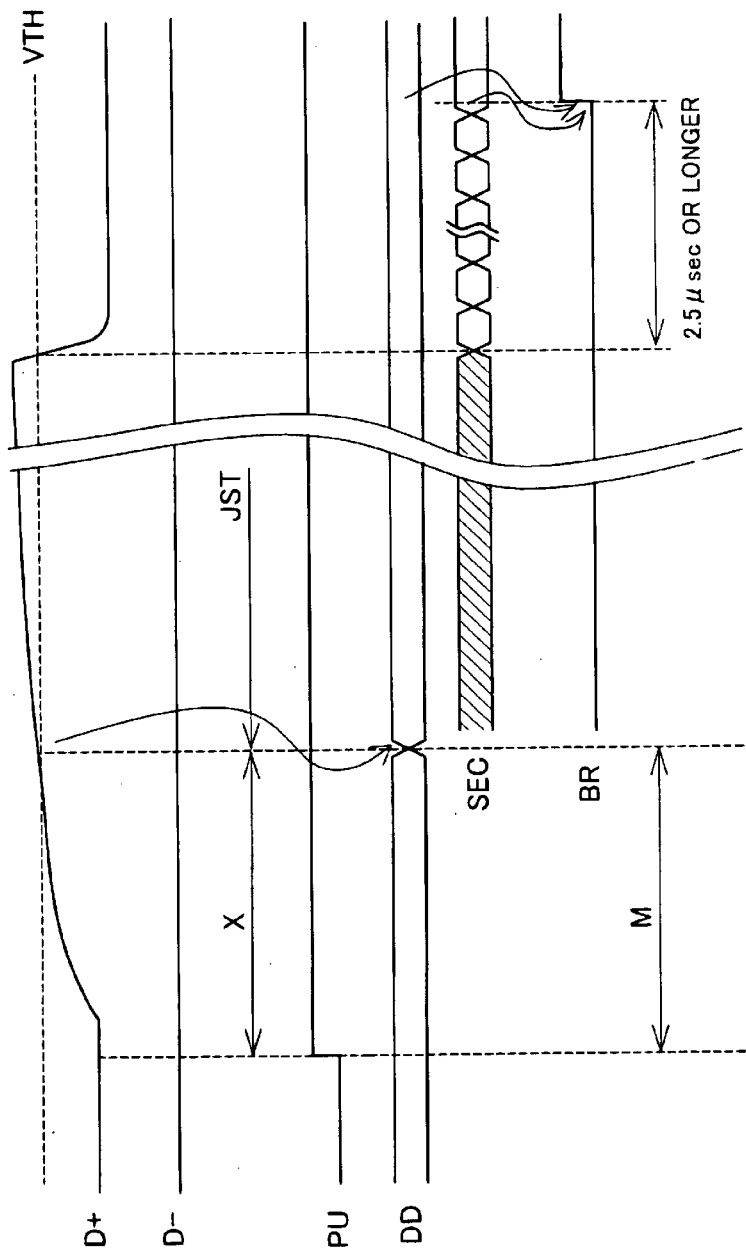
FIG. 4 is an operational waveform of the second embodiment.

FIG. 4 shows operational waveform of the second embodiment. Similar to the operational waveform of the first embodiment, pull-up operation of the signal line D+ is started after the system starts up and initial setting of the peripheral equipment is completed. Voltage level of the signal line D+ goes up to pull-up level taking a predetermined time. During its transition period X, the signal lines D+ and D− are in negate state and are in equivalent SE0 state in terms of voltage level. Voltage levels of the signal lines D+ and D− are directly detected by state signals DD, output signals from the receiver 15, so that the termination control device 2 should not detect the above voltage-equivalent SE0 state as SE0 equivalent state erroneously, whereby a masking period M is set.

That is, state signals DD control the SE0 duration counter 17. Thereby, the SE0 duration counter 17 is kept in non-active state before the signal line D+ and D− shift to J-state JST. Consequently, it never occurs that a state of a transition period X is erroneously detected as SE0 state and the SE0 duration counter 17 starts timing the SE0 duration.

Furthermore, state signals DD control the bus reset detecting section 21. Thereby, the bus reset detecting section 21 is kept in a non-active state before the signal lines D+ and D− shift to J-state JST and it never occurs that the non-active state that lasts during a transition period X is erroneously detected as bus reset state.

When state signals DD shift and turn into a signal indicating J-state JST along with termination of a transition period X, a masking period M terminates. Thereby, the SE0 duration counter 17 and the bus reset detecting section 21 are activated. Voltage levels of the signal lines D+ and D− that have shifted to J-state JST with timing after activation of the SE0 duration counter 17 and the bus reset detecting section 21 are monitored so as to detect SE0 state driven by the host or the like or bus reset state as a duration result of SE0 state.

In the above, there has been described such that state signals DD are inputted to both the SE0 duration counter 17 and the bus reset detecting section 21. However, an effect same as the above case can be obtained by an input to either one of the SE0 duration counter 17 or the bus reset detecting section 21, of course.

As described, in the termination control device 2 and the universal serial bus system directed to the second embodiment, an SE0 state and a bus reset state as an SE0 duration result become detectable after voltage level of the signal line D+ termination of which is started by a pull-up start signal PU as a termination start signal is detected and reaching of threshold voltage VTH recognized as termination voltage level is detected.

Accordingly, during a masking period M where voltage level is threshold voltage VTH or lower that is detected by the receiver 15, SE0 state and bus reset state as an SE0 duration result are masked to be undetectable. Therefore, the termination control device 2 does not detect SE0 state and bus reset state as an SE0 duration result during a transition period X at the very initial of starting-up. A masking period M terminates along with bus state shifting to J-state JST.

Therefore, an SE0 state along with bus reset sequence command from the host or the like can be detected during the J-state JST after the transition. That is, normal SE0 state or bus reset state as an SE0 duration result can surely be detected while erroneous detection at the initial of starting-up is avoided, whereby termination control can surely be executed.

The present invention is not limited to the embodiment described above and may of course be improved or modified in various manners within the scope and spirit of the present invention.

For example, the above embodiments describe a case of recognition procedures of peripheral equipment at the stage of system start-up as examples, however, the present invention is not limited to them but is applicable to bus termination operation executed while it shifts to suspended state from high-speed mode or other termination operations.

Furthermore, the embodiments describe a case of pulling up voltage level as bus termination, however, the present invention is not limited to the above but is applicable to termination to a predetermined voltage level including pull-down.

Furthermore, the embodiments take signal line D+ as a signal line to be terminated, however, the present invention is applicable to the signal line D− in same manner as the signal line D+ and further applicable in case termination operation is conducted for other signal lines.

Furthermore, in the preferred embodiments, the first embodiment and the second embodiment are separately described, however, aspects of the above two embodiments can be combined.

According to the present invention, there is provided a termination control device and a universal serial bus system capable of achieving stable system operation wherein the termination control device controls termination considering propagation delay time required for bus voltage level to shift to termination voltage when a universal serial bus system is terminated and an erroneous detection due to propagation delay time of voltage level shifting is avoided, accordingly.

What is claimed is:

1. A termination control device capable of switching presence/absence of termination for predetermined signal line(s) for a universal serial bus, the termination control device comprising:
  a permission timing setting section for outputting a permission signal by timing predetermined length of time from a termination start signal; and
  a state detecting section for detecting a state of the predetermined signal line(s), the state detecting section being activated based on the permission signal.

2. A termination control device according to claim 1 further comprising:
  a timing section for starting to time based on the termination start signal; and
  a comparator for outputting the permission signal based on a result of comparison between timing time by the timing section and the predetermined time.

3. A termination control device according to claim 1, wherein the predetermined time can be set outside of the termination control device.

4. A termination control device according to claim 1, wherein the termination corresponds to pulling up of voltage level at the predetermined signal line(s), and the state detecting section includes a duration monitoring section for monitoring duration of an SE0 state at the predetermined signal line(s), the duration monitoring section being activated based on the permission signal.

5. A termination control device according to claim 4, wherein the termination corresponds to pulling up of voltage level at the predetermined signal line(s), and the state detecting section includes a bus-reset detecting section for detecting a bus-reset state based on a duration signal from the duration monitoring section, the duration monitoring section being activated based on the permission signal.

6. A termination control device according to claim 1, wherein the termination corresponds to pulling up of voltage level at the predetermined signal line(s), and the state detecting section can detect an SE0 state at the predetermined signal line(s) upon activation based on the permission signal.

7. A termination control device according to claim 1, wherein the termination corresponds to pulling up of voltage level at the predetermined signal line(s), and the state detecting section can detect a bus-reset state being propagated through the predetermined signal line(s) upon activation based on the permission signal.

8. A termination control device capable of switching presence/absence of termination for predetermined signal line(s) for a universal serial bus, the termination control device comprising:
  a voltage detecting section for detecting voltage level of the predetermined signal lines; and
  a state detecting section for detecting a state of the predetermined signal line(s), the state detecting section being activated based on an alarm signal outputted from the voltage detecting section when voltage level at the predetermined signal line(s) reaches termination voltage level.

9. A termination control device according to claim 8, wherein the termination corresponds to pulling up of voltage level at the predetermined signal line(s), and the state detecting section includes a duration monitoring section for monitoring duration of an SE0 state at the predetermined signal line(s), the duration monitoring section being activated based on the alarm signal.

10. A termination control device according to claim 9, wherein the termination corresponds to pulling up of voltage level at the predetermined signal line(s), and the state detecting section includes a bus-reset detecting section for detecting a bus-reset state based on a duration signal from the duration monitoring section, the duration monitoring section being activated based on the alarm signal.

11. A termination control device according to claim 8, wherein the termination corresponds to pulling up of voltage level at the predetermined signal line(s), and the state detecting section can detect an SE0 state at the predetermined signal line(s) upon activation based on the alarm signal.

12. A termination control device according to claim 8, wherein the termination corresponds to pulling up of voltage level at the predetermined signal line(s), and the state detecting section can detect a bus-reset state being propagated through the predetermined signal line(s) upon activation based on the alarm signal.

13. A termination control device capable of switching presence/absence of termination for predetermined signal line(s) for a universal serial bus, the termination control device comprising:
  a permission timing setting section for outputting a permission signal by timing predetermined length of time from a termination start signal;
  a voltage detecting section for detecting voltage level of the predetermined signal line(s); and a state detecting section for detecting a state of the predetermined signal line(s) upon activation based on mechanism that the permission signal and an alarm signal outputted from the voltage detecting section when voltage level of the predetermined signal line(s) reaches termination voltage level are inputted and activated.

14. Universal serial bus system capable of switching presence/absence of termination for predetermined signal line(s), the universal serial bus system comprising:

a permission timing setting section for outputting a permission signal by timing predetermined length of time from a termination start signal; and a state detecting section for detecting a state of the predetermined signal line(s), the state detecting section being activated based on the permission signal.

15. Universal serial bus system capable of switching presence/absence of termination for predetermined signal line(s), the universal serial bus system comprising:

a voltage detecting section for detecting voltage level of the predetermined signal line(s); and a state detecting section for detecting state of the predetermined signal line(s), the state detecting section being activated based on an alarm signal outputted from the voltage detecting section when voltage level at the predetermined signal line(s) reaches termination voltage level.

16. Universal serial bus system capable of switching presence/absence of termination for predetermined signal line(s), the universal serial bus system comprising:

a permission timing setting section for outputting a permission signal by timing predetermined length of time from a termination start signal;

a voltage detecting section for detecting voltage level of the predetermined signal line(s); and a state detecting section for detecting a state of the predetermined signal line(s), the state detecting section being activated based on mechanism that the permission signal and an alarm signal outputted from the voltage detecting section when voltage level of the predetermined signal line(s) reaches termination voltage level are inputted and activated.

* * * * *